US006562433B1

(12) United States Patent
Ishida et al.

(10) Patent No.: US 6,562,433 B1
(45) Date of Patent: May 13, 2003

(54) METHOD FOR THE PREPARATION OF POLYCARBONATE WITH REDUCED LEVELS OF FRIES

(75) Inventors: Hiromi Ishida, Moka (JP); Kenichi Ishiwa, Oyama (JP); Mitsuyasu Okamura, Utsunomiya (JP); Tomoaki Shimoda, Ichihara (JP); Theodorus L. Hoeks, Bergen op Zoom (NL); Henricus H. M. van Hout, Halsteren (NL); Monica M. Marugan, Bergen op Zoom (NL); Patrick J. McCloskey, Watervliet, NY (US); Joseph A. King, Jr., Midlothian, VA (US); Paul M. Smigelski, Jr., Schenectady, NY (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 09/663,857

(22) Filed: Sep. 18, 2000

Related U.S. Application Data

(63) Continuation-in-part of application No. 09/215,482, filed on Dec. 18, 1998, now abandoned.

(51) Int. Cl.$^7$ .......................... C08G 64/30; G11B 7/24
(52) U.S. Cl. ................... 428/64.7; 528/196; 528/198; 528/199; 528/200; 525/67; 525/462
(58) Field of Search ............................. 528/198, 199, 528/200, 176; 525/67, 462; 428/64.7

(56) References Cited

U.S. PATENT DOCUMENTS

| 4,371,660 A | | 2/1983 | Calundann et al. |
| 4,526,926 A | * | 7/1985 | Weber |
| 5,187,242 A | | 2/1993 | Sakashita et al. |
| 5,319,066 A | | 6/1994 | King, Jr. |
| 5,340,905 A | | 8/1994 | Kühling et al. |
| 5,399,659 A | | 3/1995 | Kühling et al. |
| 5,418,316 A | | 5/1995 | Kühling et al. |
| 5,484,875 A | | 1/1996 | Sakashita et al. |
| 5,652,313 A | | 7/1997 | Kühling et al. |
| 5,767,224 A | | 6/1998 | Kühling et al. |
| 5,942,594 A | | 8/1999 | Nakae et al. |

FOREIGN PATENT DOCUMENTS

| EP | 0 852 242 A1 | | 7/1998 |
| JP | 2153925 | | 6/1990 |
| JP | 7-53704 | | 8/1993 |
| JP | 05271401 | | 10/1993 |
| JP | 6009768 | | 1/1994 |
| JP | 6032886 | | 2/1994 |
| JP | 9059371 | | 3/1997 |
| WO | 97/11107 | * | 3/1997 |

OTHER PUBLICATIONS

U.S. Provisional Application Ser. No. 60/109,472 filed Nov. 23, 1998 (Docket No. 8CJ–12606PA).
U.S. Provisional Application Ser. No. 60/109,496 filed Nov. 23, 1998 (Docket No. 8CJ–12607PA).
U.S. Provisional Application Ser. No. 60/109,495 filed Nov. 23, 1998 (Docket No. 8CJ–12608PA).
U.S. Provisional Application Ser. No. 60/109,473 filed Nov. 23, 1998 (Docket No. 8CJ–12609PA).
International Search Report for International Application No. PCT/US99/24298.
Derwent Abstracts of J9059371, J6032886, J2153925.

* cited by examiner

*Primary Examiner*—David J. Buttner

(57) ABSTRACT

The present invention provides a composition comprising polycarbonate wherein the polycarbonate has a very low Fries content (e.g., above 5 ppm and below 360 ppm). The present invention also provides a polycarbonate having a very low Fries content which is made by the melt process. This polycarbonate has high ductility and high impact strength. The invention also provides a method for making these compositions. Another aspect of the invention is an optical disk comprising polycarbonate having a very low Fries content which is made by the melt process. Such optical disks resist breakage due to bending.

20 Claims, 1 Drawing Sheet

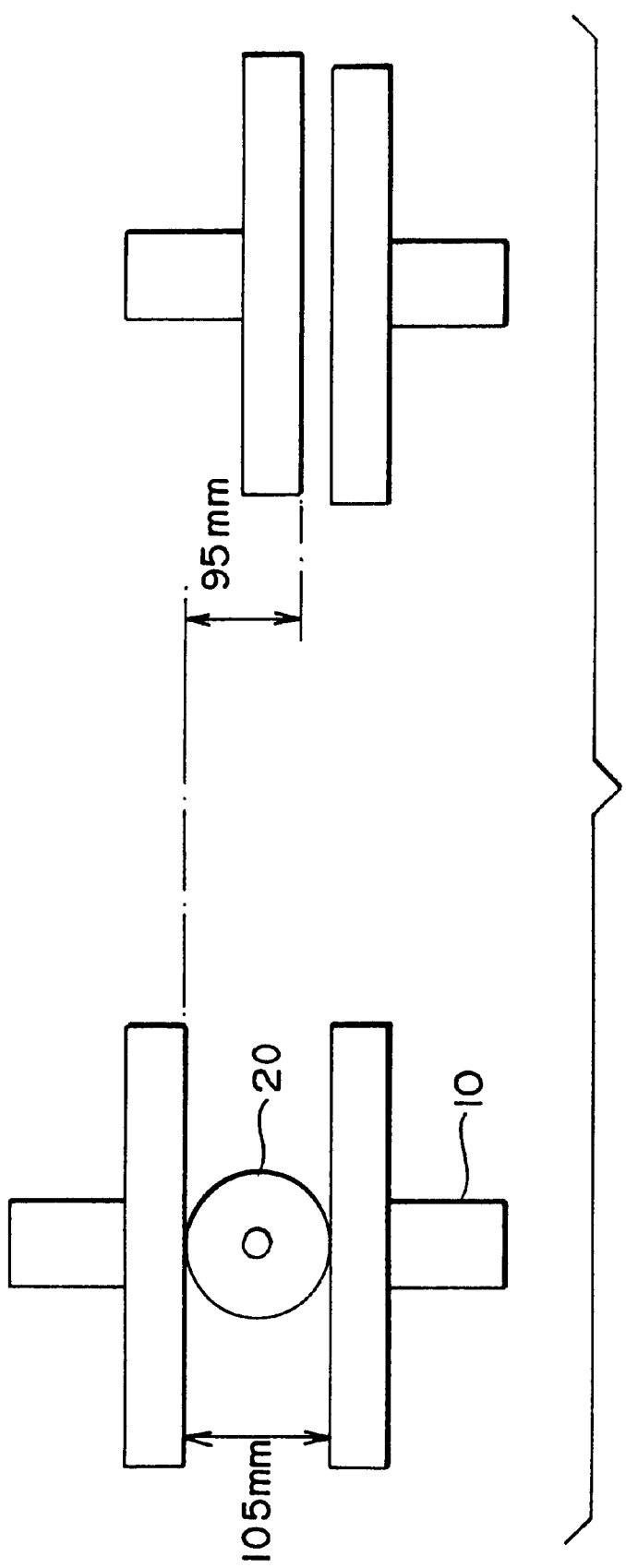

METHOD FOR THE PREPARATION OF POLYCARBONATE WITH REDUCED LEVELS OF FRIES

CROSS REFERENCE TO RELATED APPLICATIONS

This application is a continuation in part of U.S. application Ser. No. 09/215,482 field Dec. 18, 1998 now abandoned.

BACKGROUND

This invention relates to a composition comprising polycarbonate, wherein the polycarbonate has a low content of a particular branching species. This branching species is commonly known as the "Fries" branching species (hereinafter "Fries"), and upon treatment yields the molecule shown in formula I. More particularly, this invention relates to low Fries polycarbonate made by the melt synthesis method. This invention further relates to an optical disk comprising said low Fries polycarbonate, and to a method of injection molding which employs said polycarbonate.

Conventional industrial plants synthesize polycarbonate by mixing together an aqueous solution of a dihydroxy compound (e.g., bisphenol-A) with an organic solvent (e.g., dicloromethane) containing a carbonyl halide (e.g., phosgene). Upon mixing the immiscible organic and aqueous phases, the dihydroxy compound reacts with the carbonyl halide at the phase interface. Typically, a phase transfer catalyst, such as a tertiary amine, is added to the aqueous phase to enhance this reaction. This synthesis method is commonly known as the "interfacial" synthesis method for preparing polycarbonate.

The interfacial method for making polycarbonate has several inherent disadvantages. First, it is a disadvantage to operate a process which requires phosgene as a reactant due to obvious safety concerns. Second, it is a disadvantage to operate a process which requires using large amounts of an organic solvent because expensive precautions must be taken to guard against any adverse environmental impact. Third, the interfacial method requires a relatively large amount of equipment and capital investment. Fourth, the polycarbonate produced by the material process is prone to having inconsistent color, higher levels of particulates, and higher chlorine content, which can cause corrosion.

A new method of manufacturing has been developed which avoids several of the problems which the interfacial method. Specifically, some newer commercial polycarbonate plants synthesis polycarbonate by a transesterification reaction where a carbonate diester (e.g., diphenylcarbonate) is condensed with a dihydroxy compound (e.g., bisphenol-A). This reaction is performed without a solvent, and is driven to completion by mixing the reactants under reduced pressure and high temperature with simultaneous distillation of the phenol produced by the reaction. This synthesis technique is commonly referred to as the "melt" technique. The melt technique is superior over the interfacial technique because it does not employ phosgene, it does not require a solvent, and it uses less equipment. Moreover, the polycarbonate produced by the melt process does not contain chlorine contamination from the reactants, has lower particulate levels, and has a more consistent color. Therefore, it is highly desirable to use the melt technique in a commercial manufacturing process. In fact, the assignee has built the world's first commercial plants which use the melt technique.

The melt technique produces polycarbonate which differs from polycarbonate produced by the interfacial method. Specifically, the conventional interfacial method tends to produce polycarbonate which has close to zero branching. It is desirable to have a low level of branching for some applications, such as those which require very high ductility, but a high level of branching is desireable for other applications which require high melt strength. If branching is desired in polycarbonate produced by the interfacial process, it must be introduced by adding a branching agent during polymerization. Also, the Fries branching species is not typically present in appreciable amounts in interfacial polycarbonate. In contrast, the melt technique tends to produce polycarbonate having a high level of Fries. Accordingly, it would be desirable to produce low Fries polycarbonate by the melt technique for certain applications because higher levels of Fries are associated with low ductility. As noted below, Applicants have solved this problem.

Japanese Published Patent Application Number 9-59371 to Teijin (hereinafter the "Teijin Publication") discloses a method for manufacturing polycarbonate by the melt process wherein the polycarbonate contains from 0.001 to 0.3 mole percent of Fries plus a second branching species, but contains at least 0.001 mole percent of the second branching species. Therefore, the Teijin Publication specifies melt polycarbonate having a level of Fries below 0.299 mole percent. However, the Teijin Publication does not teach how to make polycarbonate by the melt process which has a very low level of Fries. In fact, the Teijin publication only discloses a polycarbonate made by the melt process having a level of Fries above about 360 ppm (working example 3) and does not mention catalysts which are effective in significantly reducing Fries content. Moreover, the Teijin Publication does not disclose the advantages of using melt polycarbonate having a very low level of Fries in specific applications.

Polycarbonate is widely used in optical disk applications. Examples of optical disks include disks used only for data reproduction, such as the compact audio disk "CD", video disc "VD" and CD-ROM formats. Also, newer optical disks can be used for both recording and reproduction. Examples of such applications include write-once optical disks, and erasable writing and reproduction optical disks. Such disks are typically seated into a tray, and slid into the device via an electric servo which moves the disk back into the device. If the disk is improperly seated in the tray, the disk will be subject to lateral stress as it holds open the tray. This occurrence happens often enough such than many manufacturers have modified their equipment to reverse direction, sliding the tray back out if the motor encounters sufficient resistance. In view of this eventuality and others (e.g., bending of mailed optical disks), optical disks must be manufactured with sufficiently high ductility such that they will not snap easily if they are bent. Polycarbonate made by the interfacial process typically has sufficiently high ductility such that it can be used, without modification, in optical disk applications. However, polycarbonate made by the melt process typically has fairly low ductility due to its high level of Fries. Therefore, there is a need for a method to produce optical disks from low Fries polycarbonate made by the melt process. As noted below, Applicants have solved this problem by discovering a way to make low Fries melt polycarbonate having high ductility.

Additionally, a general need clearly exists for a polycarbonate made by the melt process which has a very low level of Fries. A need also exists for a method for making low Fries polycarbonate via the melt process.

SUMMARY OF THE INVENTION

The above-described deficiencies of the prior art are substantially overcome in accordance with the present invention. Specifically, the present invention provides a composition comprising polycarbonate wherein the polycarbonate has a very low Fries content (e.g., above 5 ppm and below 360 ppm). The present invention also provides a polycarbonate having a very low Fries content which is made by the melt process. This polycarbonate has high ductility and high impact strength. The invention also provides a method for making these compositions. Another aspect of the invention is an optical disk comprising polycarbonate having a very low Fries content which is made by the melt process. Such optical disks resist breakage due to bending.

These and other features, aspects and advantages of the present invention will become better understood with reference to the following description and the appended claims and accompanying drawings.

BRIEF DESCRIPTION OF THE DRAWINGS

FIG. 1 depicts an apparatus used for testing compact disks to determine ductility of the resin used to mold the disk.

DETAILED DESCRIPTION OF THE INVENTION

As used herein, the term "Fries" or "fries" refers to a branching repeating unit in polycarbonate which, upon treatment with KOH in methol as described in Example 1, yields the species of formula (I), which can then be analyzed via HPLC:

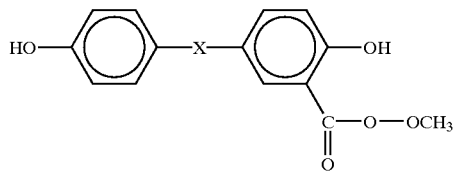
(I)

wherein X is a bivalent radical as described in formula (II).

As used herein, the term "melt polycarbonate" refers to polycarbonate made by transesterification of a carbonate diester with a dihydroxy compound.

As used herein, the term "interfacial polycarbonate" refers to polycarbonate made by mixing an aqueous solution of a dihydroxy compound together with an immiscible organic phase comprising a carbonyl halide.

The present invention provides a composition comprising melt polycarbonate, wherein the melt polycarbonate has a very low Fries content. Specifically, the Fries content is lower than 360 ppm, and above that which would be expected for ordinary interfacial polycarbonate. Interfacial polycarbonate typically has a Fries content of less than 5 ppm, and nearly always has a Fries content below 25 ppm. The present invention further provides a composition comprising melt polycarbonate having a Fries content of less than 360 ppm.

The present invention further provides a composition comprising polycarbonate wherein the polycarbonate has a low level of Fries. This polycarbonate may be melt polycarbonate or a mixture of melt and interfacial polycarbonate. Specifically, the Fries content is preferably from 5 ppm to 360 ppm. In a more preferred embodiment of the invention, the Fries content is below 290 ppm. In an even more preferred embodiment, the Fries content is from 25 ppm to 290 ppm. In a most preferred embodiment of the invention, the Fries content is below 200 ppm.

In another aspect, the present invention also provides a composition comprising polycarbonate wherein the polycarbonate has an MFR of 5 to 30. All of the MFR values given in this application were measured at 1.2 kg and 250° C., and in accordance with ISO 1133, which is incorporated by reference herein. In a preferred embodiment of the invention, the MFR is between 10 and 17. In a more preferred embodiment, the MFR is less than 15.5. In a most preferred embodiment of the invention, the MFR is less than 14.

The composition comprising polycarbonate may further comprise many different additional polymers. A non-limiting list of such additional polymers would include ABS, polyester and polyamides.

In another aspect, the present invention also provides a melt polycarbonate having an MFR of 5 to 30. In a preferred embodiment of the invention, the MFR of the melt polycarbonate is between 10 and 17. In a more preferred embodiment, the MFR is less than 15.5. In a most preferred embodiment of the invention, the MFR is less than 14.

There are at least two different methods of making a composition comprising polycarbonate wherein the composition has a fries content above that typically encountered for interfacial polycarbonate, but below 360 ppm. The simplest method merely involves blending an appropriate amount of melt polycarbonate into interfacial polycarbonate. This can be accomplished by a variety of methods, such as simply adding appropriate proportions of high Fries melt polycarbonate and interfacial polycarbonate into an extruder. Sample (2) and (3), described in Example 4, were prepared by this technique. Alternatively, one can prepare low Fries melt polycarbonate, by a method such as that shown in Example 2, and can add any other desirable ingredients which do not contain unacceptable proportions of Fries. Methods for preparing melt polycarbonate having a level of fries below 360 ppm are described generally below.

As stated above, the melt process for preparing polycarbonate comprises reacting a dihydroxy compound with a carbonate diester.

There is no particular restriction on the type of dihydroxy compound that can be used in this invention. For example, bisphenol compounds represented by the general formula (II) below can be used.

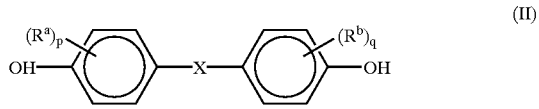
(II)

In formula (II), $R^a$ and $R^b$ each represent a halogen atom or a monovalent hydrocarbon group and may be the same or different. The p and q variables represent integers from 0 to 4.

The X variable represents

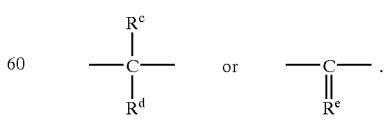

Variables $R^c$ and $R^d$ each independently represent a hydrogen atom or a monovalent hydrocarbon group. Variables $R^c$ and $R^d$ may form a ring structure. Variable $R^e$ is a divalent hydrocarbon group.

Specific examples of the types of bisphenol compounds that may be represented by formula (II) include the following:

1,1-bis(4-hydroxyphenyl) methane;
1,1-bis(4-hydroxyphenyl) ethane;
2,2-bis(4-hydroxyphenyl) propane (hereinafter referred to as "bisphenol A");
2,2-bis(4-hydroxyphenyl) butane;
2,2-bis(4-hydroxyphenyl) octane;
1,1-bis(4-hydroxyphenyl) propane;
1,1-bis(4-hydroxyphenyl) n-butane;
bis(4-hydroxyphenyl) phenylmethane;
2,2-bis(4-hydroxy-1-methylphenyl) propane;
1,1-bis(4-hydroxy-t-butylphenyl) propane;
bis(hydroxyaryl) alkanes such as 2,2-bis(4-hydroxy-3-bromophenyl) propane;
1,1-bis(4-hydroxyphenyl) cyclopentane;
or bis(hydroxyaryl) cycloalkanes such as 1,1-bis(4-hydroxyphenyl) cyclohexane.

In the present invention, the X in the bisphenol shown in the above formula may represent an —O—, —S—, —SO—, or —SO$_2$— group, for example:

4,4'-dihyrdoxydiphenyl ether;
a bis(hydroxyaryl) ether such as 4,4'-dihyrdoxy-3,3'-dimethylphenyl ether;
4,4'-dihyrdoxydiphenyl sulfide;
a bis(hydroxyaryl) sulfide such as 4,4'-dihyrdoxy-3,3'-dimethyldiphenyl sulfide;
4,4'-dihydroxydiphenyl sulfoxide;
a bis(hydroxyaryl) sulfoxide such as 4,4'-dihyrdoxy-3,3'-dimethyldiphenyl sulfoxide;
4,4'-dihyrdoxydiphenyl sulfone;
or a bis(hydroxyaryl) sulfone such as 4,4'-dihyrdoxy-3,3'-dimethyldiphenyl sulfone.

In addition, the bisphenol used may be a compound represented by formula (III) below.

(III)

In the formula (III), R$^f$ may represent a halogen atom, a hydrocarbon group containing 1 to 10 carbon atoms, or a halogen substituted hydrocarbon group. The variable n represents an integer from 0 to 4. If n is 2 or greater, the groups represented by R$^f$ may be the same or different.

The bisphenol represented by formula (III) may be, for example: resorcinol; a substituted resorcinol compound such as 3-methylresorcinol, 3-ethylresorcinol, 3-propylresorcinol, 3-butylresorcinol, 3-t-butylresorcinol, 3-phenyl-resorcinol, 3-cumylresorcinol, 2,3,4,6-tetrafluororesorcinol, and 2,3,4,6-tetrabromo-resorcinol; catechol; hydroquinone; or a substituted hydroquinone compound such as 3-methylhydroquinone, 3-ethylhydroquinone, 3-propylhydroquinone, 3-butylhydroquinone, 3-t-butylhydroquinone, 3-phenylhydroquinone, 3-cumrylhydroq-uinone, 2,3,5,6-tetramethylhydroquinone, 2,3,5,6-tetra-t-butylhydroquinone, 2,3,5,6-tetrafluorohydroquinone, and 2,3,5,6-tetrabromohydroquinone.

Alternatively, the bisphenol represented by formula (III) may be a compound according to formula (IV) below:

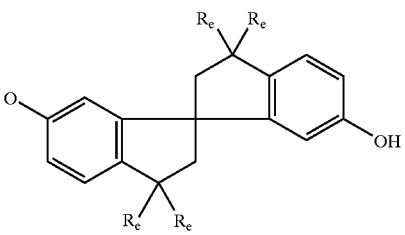
(IV)

wherein R$_e$ represents a C$_{1-3}$ alkyl or a phenyl group. A preferred compound according to formula (IV) is 2,2,2',2'-tetrahydro-3,3,3',3'-tetramethyl-,1, 1'-spirobi-[1H-indane]-6,6'-diol.

Of the above compounds, the bisphenols represented by formula (II) are preferable. The most preferred compound is bisphenol A.

It is also possible to combine, two, three, or more of the above dihydroxy compounds by copolymerization to manufacture copolycarbonates.

The carbonate diester compound used in this invention may be: diphenyl carbonate, bis(4-t-butylphenyl) carbonate, bis(2,4-dichlorophenyl) carbonate, bis(2,4,6-trichlorophenyl) carbonate, bis(2-cyanophenyl) carbonate, bis(o-nitrophenyl) carbonate, ditolyl carbonate, m-cresol carbonate, dinapthyl carbonate, bis(diphenyl) carbonate, diethyl carbonate, dimethyl carbonate, dibutyl carbonate, or dicylcohexyl carbonate. Of these, diphenyl carbonate is preferred. If two or more of these compounds is combined, it is preferable to use diphenyl carbonate as one component of the combination.

The carbonate diesters used in this invention may also contain dicarboxylic acids or dicarboxylic acid esters. Specifically, for the carbonate diester, dicarboxylic acids or the dicarboxylic acid esters should preferably be present at no greater than 50 mole percent, and more preferably at no greater than 30 mole percent.

These dicarboxylic acids or dicarboxylic acid esters may include terephthalic acid, isophthalic acid, sebacic acid, decanedioic acid, dodecanedioic acid, diphenyl sebacate, diphenyl terephthalate, diphenyl isophthalate, diphenyl decanedioate, or diphenyl dodecanedioate. The carbonate diesters may also contain a combination of 2 or more dicarboxylic acids and/or dicarboxylic acid esters.

Polyester polycarbonates can be also be manufactured by polycondensation of a diester carbonate containing the above types of dicarboxylic acids and/or dicarboxylic acid esters with the previously mentioned aromatic dihydroxy compounds.

During the manufacture of low Fries polycarbonates, the amount of the above types of carbonate diesters should be kept at a ratio of 0.95 to 1.30 moles, and more preferably at a ratio of 1.01 to 1.20 moles, per 1 mole used of the aromatic dihydroxy compound.

Polyfunctional compounds having three or more functional groups per molecule may be added to the above-mentioned aromatic dihydroxy compounds and carbonate diesters in order to manufacture polycarbonates by copolymerization. However, it is generally not preferred to use such polyfunctional compounds when attempting to manufacture low Fries polycarbonate.

The total amount of alkali metal compounds and alkaline earth metal compounds present as impurities in the above dihydroxy compounds and carbonate diesters should be no greater than 1×10$^{-6}$ mole, and preferably no greater than 5×10$^{-7}$ mole, per 1 mole of the dihydroxy compound.

A total amount of alkali metal compounds and/or alkaline earth metal compounds present as impurities within the above dihydroxy compounds and carbonate diesters of greater than $1\times10^{-7}$ mole per 1 mole of the dihydroxy compound may inhibit the effectiveness of the catalyst.

These types of high purity dihydroxy compounds and carbonate diesters can be obtained by purifying impure dihydroxy compound and carbonate diesters. Distillation, recrystallization, and other well known methods are suitable for this purpose.

Polycarbonates are preferably manufactured in a closed system wherein the apparatus for manufacturing the raw materials and the apparatus for manufacturing the polycarbonates are directly connected. Manufacturing polycarbonates in this type of closed system can help to eliminate mixing in of impurities.

During the manufacture of polycarbonates described in this invention, a termination agent may also be used with the above-mentioned aromatic dihydroxy compounds and carbonate diesters.

The termination agent is preferably an aryloxy compound, represented by the general formula (V) below, and can be introduced as a terminal group to the end of the manufactured polycarbonate molecules.

$$\text{ArO—} \tag{V}$$

In formula (V), Ar represents an aromatic hydrocarbon group containing 6 to 50 carbon atoms. There is no specific restriction on the type of aromatic hydrocarbon group. A condensed ring structure such as a phenyl group, naphthyl group, or anthranyl group may be used. Moreover, the aromatic ring with saturated carbon atom(s) and/or different atoms may form cyclic structures. In addition, these aromatic rings may be substituted with a halogen or alkyl group containing 1 to 9 carbon atoms.

These type of aryloxy compounds may include: phenol, diphenyl carbonate, p-tert-butylphenol, p-tert-butylphenylphenyl carbonate, p-tert-butylphenyl carbonate, p-cumylphenol, p-cumylphenylphenyl carbonate, p-cumylphenyl carbonate; and chroman compounds such as 2,2,4-trimethyl-4-(4-hydroxyphenyl) chroman, 2,2,4,6-tetramethyl4-(3,5-dimethyl-4-hydroxyphenyl) chroman, 2,2,3-trimethyl-3-(4-hydroxyphenyl) chroman, 2,2,3,6-tetramethyl-3-(3,5-dimethyl-4-hydroxyphenyl) chroman, 2,4,4-trimethyl-2-(2-hydroxyphenyl) chroman, and 2,4,4,6-tetramethyl-2-(3,5-dimethyl-2-hydroxyphenyl)chroman.

One or a combination of the above types of aryloxy compounds may be used in this invention.

These aryloxy compounds should be present in amounts of 0.01 to 0.2 mole, preferably at 0.02 to 0.15 mole, and more preferably at 0.02 to 0.1 mole per 1 mole of the aromatic dihydroxy compound.

The melt polycarbonate preferably has an end-capping content of at least 85%, and more preferably at least 96%. Additional end-capping techniques and agents are described in U.S. Pat. No. 5,187,242, which is hereby incorporated by reference.

Other terminating agents may also be used, such as aliphatic monocarboxy compounds according to formula (VI).

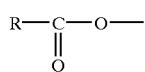
$$\tag{VI}$$

In formula (VI), R represents an alkyl group containing 10 to 30 carbon atoms. The alkyl group may be linear or branched. The alkyl group may also be substituted by a halogen.

Specific examples of such aliphatic monocarboxy compounds include; alkyl monocarboxylic acids such as undecanoic acid, lauric acid, tridecanoic acid, pentadecanoic acid, palmitic acid, heptadecanoic acid, stearic acid, nonadecanoic acid, heneicosanoic acid, tricosanoic acid, and mellisic acid; and alkyl monocarboxylic acid esters, including alkyl monocarboxylic acid methyl esters, ethyl esters, and phenyl esters such as methyl stearate, ethyl stearate, and phenyl stearate.

One, or a combination of the above terminating agents may be used in this invention. These types of aliphatic monocarboxy compounds should be present in amounts of 0.01 to 0.20 mole, preferably at 0.02 to 0.15 mole, and more preferably at 0.02 to 0.10 mole per 1 mole of the aromatic dihydroxy compound. Use of the above types of termination agents in total amounts greater than 0.2 mole per 1 mole of the aromatic dihydroxy compound may reduce the rate of polymerization.

Several types of catalysts are suitable for making polycarbonate having a Fries level below 360 ppm. Experimental investigations have shown that lithium salts provide the lowest level of Fries when comparing the ascending weight series of alkali metals: lithium, sodium and potassium. However, cesium catalyst are superior to potassium in producing low Fries polycarbonate. Experiments showed that the following anions produced more Fries in accordance with the following relationship: halide>$H_2PO_4$>$HPO_4^{-2}$<$OH^-$. This order suggests that Fries formulation may be predicted from the relative basicity of the added catalyst.

It was further found that amines, ammonium and phosphonion salts produced even less Fries than lithium salts. Therefore, these catalysts are preferred. More preferred catalyst include cesium salts, amines, tetra-alky ammonium salts, tetra-alkyl phosphonium salts, and guanidines. Among these, the most preferred catalysts are guanidines, alkali metal phosphites and alkali earth metal phosphites. Many suitable types of guanidine catalysts are described for example in U.S. Pat. No. 5,319,066, which is hereby incorporated by reference. Many suitable types of alkali metal phosphite catalysts and alkali earth metal phosphite catalysts are described in U.S. Provisional Patent Application Serial Nos. 60/109,496, 60/109,495, 60/109,472 and 60/109,473, all filed on Nov. 23, 1998, which are hereby incorporated by reference.

In the present invention, polycarbonates are manufactured by melt polycondensation of the previously mentioned dihydroxy compounds and carbonate diesters in the presence of the above described catalysts. Specifically, the dihydroxy compound and the carbonate diester are preferably reacted at atmospheric pressure during the first stage reaction at a temperature of 80 to 250° C., preferably at 100 to 230° C., and more preferably at 120 to 190° C., and in general for 0 to 5 hours, preferably for 0 to 4 hours, and even more preferably for 0 to 3 hours. Next, the dihydroxy compound and the carbonate diester should be reacted as the pressure of the system is lowered and the temperature is raised. Finally, the polycondensation reaction of the dihydroxy compound with the carbonate diester should be carried out at 240 to 320° C. at less than 5 mm Hg, and preferably at less than 1 mm Hg.

The above polycondensation reaction may be carried out by a continuous or batch method. The apparatus used for carrying out the above reaction may be a vessel, tube, or tower-like structure.

The intrinsic viscosity of the polycarbonate products measured in methylene chloride at 20° C. should be 0.10 to 1.0 dl/g, and preferably 0.30 to 0.65 dl/g.

The above manufacturing method can provide a polycarbonate with excellent color stability.

The polycarbonate reaction product obtained as described above does not have to be cooled. Instead, immediately after the polycondensation reaction, a derivative formed from a sulfur containing acidic compound and/or the acidic compound with a pKa of no greater than 3 (hereinafter also referred to as the acidic compound), may be added. This derivative formed may be sulfurous acid, sulfuric acid, a sulfinic acid compound, a sulfonic acid compound, or any related derivative. Specific examples include ethyl benzenesulfonate, butyl benzenesulfonate, methyl p-toluenesulfonate, ethyl p-toluenesulfonate, and butyl p-toluenesulfonate.

The amount of the derivative present should be 0.1 to 50 moles, preferably 0.1 to 15 moles, and more preferably 0.1 to 7 moles times the amount of alkali metal phosphite used in the above polycarbonate reaction. The addition of these amounts of the acidic compound to the reaction product (polycarbonate) will neutralize or dilute any remaining alkali metal phosphite in the polycarbonate, ultimately providing a polycarbonate with improved stability and moisture resistance.

Furthermore, water may also be added with the above acidic compounds. The amount of water added to the poly carbonate should be from 5 to 1000 ppm, preferably 10 to 500 ppm, and more preferably 20 to 300 ppm. Addition of the acidic compound and water will further increase the efficiency of neutralization of the polycondensation catalyst in the polycarbonate, and can result in the production of a polycarbonate with good stability during melting together with excellent initial color, transparency, moisture resistance, and weather resistance.

Mixing of the polycarbonate may be carried out using a single screw extruder, twin screw extruder, or other conventional kneader such as a static mixer. A kneader with or without bends can be effectively used.

Furthermore, the acidic compound and water may be added while the polycarbonate obtained by the polycondensation reaction is in a molten state within the reactor or extruder. The acidic compound and water may be added separately or together. Although the order of addition is not limited, they should preferably be added at the same time.

Additives may also be added to the polycarbonate product as long as they do not adversely effect the basic objectives of this invention. These additives include a wide range of substances that are conventionally added to polycarbonates for a variety of purposes. Specific examples include heat stabilizers, epoxy compounds, ultraviolet absorbers, mold release agents, colorants, antistatic agents, slipping agents, anti-blocking agents, lubricants, anti-fogging agents, natural oils, synthetic oils, waxes, organic fillers, flame retardants, inorganic fillers, and any other commonly known class of additives.

The polycarbonates produced by the method in this invention are ideal for a number of applications, especially those requiring high ductility and impact strength. For example, these polycarbonates are useful for headlight lenses for automobiles, as optical lenses for glasses, and as optical recording materials. These polycarbonates are especially ideal for use as molding materials for optical discs.

The present invention is further described by way of the following examples. These examples are intended to be representative of the invention and are not in any way intended to limit its scope.

EXAMPLE 1

Preparation of Melt Polycarbonate Having Differing Levels of Fries

Numerous different catalyst were screened in a melt synthesis process to determine how they affected the Fries content of the polycarbonte product. The results are summarized below in Table 1.

TABLE 1

Various Catalysts for Melt Polymerization and Their Effect on Fries Product Formation.

| Sample Number | Catalyst | Concentration ($\times 10^4$) (moles/mole BPA) | Fries Product (ppm) |
|---|---|---|---|
| 1 | LiOH(2.5) | 0.81 | 2227 |
| 2 | NaOH(2.5) | 0.25 | 4332 |
| 3 | KOH(2.5) | 0.15 | 4902 |
| 4 | CsOH(2.5) | 0.042 | 4500 |
| 5 | TBPH(25) | 2.06 | 1000 |
| 6 | Ti(Obu)$_4$ | 0.17 | 750 |
| 7 | HEG(BPA)$_2$ | 0.90 | 530 |
| 8 | 1,3,4,6,7,8-hexhydro-1methyl-2H-pyrimdo[1,1-a]pyrimidine | 0.41 | 150 |

HEG(BPA)$_2$ is Hexaethyl guanidinium bis BPA salt, TBPH is tetrabutyl phosphonium hydroxide or BPA-salt.

The following is a description of exactly how the preparation was performed for sample number 5 in Table 1. The remaining samples were prepareded by an otherwise identical procedure using the other catalysts listed in Table 1.

Synthesis of Sample 1

BPA (136.9 g; 0.600 mol) and DPC (138.9 g; 0.648 mol) were added into a one liter glass melt polymerization reactor as powders along with the tetrabutylphosphonium hydroxide ($2.06 \times 10^{-4}$ mol); the glass reactor surfaces had been previously passivated via acid washing, rinsing, and subsequently drying at 70° C. overnight. The reactor vessel was deoxygenated by evacuation to about 1 torr and then refilling the vessel with purified nitrogen. This deoxygenation procedure was repeated a total of three times. The reactor vessel was immersed in a fluidzed heat bath preheated to 180° C. The reaction mixture was allowed to melt, producing a colorless, homogenous liquid. Once a majority of the solid material melted, the remaining powder suspension was slowly stirred to promote better heat exchange. Upon forming a complete solution, the system was allowed to thermally equilibrate for 5–10 min. The solution was then stirred at 250 rpm. At this time, the reaction temperature was raised to 210° C., and the pressure lowered to 175 mmHg. Phenol began to distill from the reactor immediately (approx. 3–4 drops/sec). After 35 minutes, the reactor pressure was lowered to 100 mmHg and held at this pressure for an additional 35 min. Phenol continued to distill into the receiver flask during this time (2 drops/sec) and a total volume of 68 mL was collected by the end of 210° C. stage. The reactor temperature was then raised to 240° C. (15 torr), and these conditions were maintained for 40 min. During this time period, phenol distilled at an average rate of about 1 drop/3–5 sec (a total of 105 mL were collected to this point). The reaction temperature was again raised up to 270° C. (2 torr) for 20 min, and was finally raised to 300° C. at 0.75 torr, and held for 65 min. The reaction was then terminated. A total of 122.1 grams of distillate was collected during the entire course of the reaction. The colorless, high molecular weight polycarbonate was collected yielding the following analytical data: Fries content 1000 ppms; $M_w$=53,447; $M_n$=18,256; $M_w/M_n$=2.928; $M_z$=103,907; and OH=0.120 wt %.

Measuring Fries Content

The content of Fries for each of the melt polycarbonates listed in Table 1 was determined as follows. First, 0.50 grams of polycarbonate was dissolved in 4.0 mL of THF (containing p-terphenyl as internal standard). Next, 3.0 mL of 18% KOH in methanol was added to this solution. The resulting mixture was stirred for two hours at room temperature. Next, we added 1.0 mL of acetic acid, and stirred the mixture for 5 minutes. Potassium acetate was allowed to crystallize over 1 hour. The solid was filtered off and the resulting filtrate was analyzed by liquid chromatograph using p-terphenyl as the internal standard.

EXAMPLE 2

Preparation of Melt Polycarbonate Having Less Than 360 ppm Fries

The catalysts listed in Table 2 below were used to prepare polycarbonate by the melt synthesis method.

TABLE 2

Melt Polycarbonate Having Very Low Levels of Fries

| Sample No. | Catalyst | Catalyst Concentration | Mn 280° C. | Mn 310° C. | Fries 280° C. | Fries 310° C. |
|---|---|---|---|---|---|---|
| 1 | NaOH | $1.0 \times 10^{-6}$ M | 7419 | 9696 | 145 | 471 |
| 2 | Na H$_x$PO$_3$ | $1.0 \times 10^{-6}$ M | 6626 | 9380 | 47 | 163 |
| 3 | Na H PO$_4$ | $1.0 \times 10^{-6}$ M | 2240 | 7414 | <25 | 262 |
| 4 | K$_2$SO$_4$ | $1.0 \times 10^{-6}$ M | 1542 | 2645 | <25 | 283 |
| 5 | K H$_2$PO$_4$ | $1.0 \times 10^{-6}$ M | 1907 | 9277 | <25 | 277 |
| 6 | CsH$_2$PO$_4$ | $1.0 \times 10^{-6}$ M | 7983 | 10676 | 119 | 184 |
| 7 | Cs$_2$SO$_4$ | $1.0 \times 10^{-6}$ M | 8790 | 10127 | 238 | 248 |

The following is a description of how the experiment has performed for sample number 1 above. Samples 2–7 were produced by exactly the same procedure with the exception that the catalyst and its concentration differed as described in Table 1.
Synthesis of Sample 1

To facilitate observations, and to maintain purity, melt transesterification reactions were carried out in a 1 Liter glass batch reactor equipped with a solid nickel helical agitator. The reactor bottom had a breakaway glass nipple for removal of the final melt. To remove any sodium from the glass, the reactor was soaked in 3N HCl for at least 12 hours followed by a soak in 18 Mohm water for at least 12 hours. The reactor was then dried in an oven overnight and stored covered until use. The temperature of the reactor was maintained using a fluidized sand bath with a PID controller and measured near the reactor and sand bath interface. The pressure over the reactor was controlled by a nitrogen bleed into the vacuum pump downstream of the distillate collection flasks and measured at higher pressures (760 mmHg–40 mmHg) with a mercury barometer and at lower pressures (40 mmHg–1 mmHg) with an Edwards pirani gauge.

The reactor was charged with solid bisphenol-A (General Electric Plastics Japan Ltd., 0.6570 mol) and solid diphenyl carbonate (General Electric Plastics Japan Ltd., 0.7096 mol) prior to assembly. The reactor was then assembled, sealed and the atmosphere was exchanged with nitrogen three times. With the final nitrogen exchange, the reactor was brought to near atmospheric pressure and submerged into the fluidized bath, which was at 180° C. After five minutes, agitation was begun at 250 rpm. After an additional ten minutes, the reactants were fully melted and a homogeneous mixture was assumed. Tetramethyl ammonium hydroxide (Sachem, $1.32 \times 10^{-4}$ mmol) and NaOH (J. T. Baker, $5.00 \times 10^{-7}$ mol) were added sequentially after being diluted to the proper concentrations (0.220 M TMAH and $1.00 \times 10^{-3}$ M NaOH) with deionized (18 Mohm) water. After the final catalyst was added, timing began and the temperature was ramped to 210° C. in five minutes. Once at temperature, the pressure was reduced to 1.80 mmHg and phenol distillate was immediately formed. After 25 minutes, the pressure was again reduced to 100 mmHg and maintained for 45 minutes. The temperature was then ramped to 240° C. in five minutes, and the pressure was lowered to 15 mmHg. These conditions were maintained for 45 minutes. The temperature was then ramped to 270° C. in five minutes, and the pressure was lowered to 2 mmHg. These conditions were maintained for 10 minutes. The temperature was then ramped to the final finishing temperature in five minutes, and the pressure was reduced to 1.1 mmHg. Depending upon the experiment, the finishing temperature was either 280° C. or 310° C., as shown in Table 1. After 30 minutes, the reactor was removed from the sand bath and the melt was extruded into liquid nitrogen to quench the reaction.

EXAMPLE 3

Molding Compact Disks

Compact disks were molded to determine the effect of the Fries content on ductility of a CD made therefrom. Specifically, two sets of 40 CD's were molded from two different melt polycarbonate samples having different levels of Fries.

The compact disks were molded using a Sumitomo injection molding machine. The barrel temperature was set at 330° C., and the mold temperature was set at 80° C. The cycle time was 6 seconds.

The two different melt polycarbonate samples were produced in a melt polycarbonate reactor similar to that described in Japanese Published Patent Application Nos. JP 6-32886 and JP 2-153925, which are hereby incorporated by reference.

The conditions for the two runs used to make these samples are given in Table 3 below.

TABLE 3

|  | Lot A | Lot B |
|---|---|---|
| Na in BPA, ppb | 50 | 50 |
| Additional Na, ppb | 60 | 60 |
| DPC/BPA, molar ratio | 1.095 | 1.137 |
| T3, ° C. | 297 | 309 |
| V3, torr | 1.8 | 0.8 |
| T4, ° C. | 291 | 294 |
| V4, torr | 5.0 | 3.0 |
| Throughout rate, T/h | 5.0 | 3.0 |

The CD's were then tested to determine their ductility. Specifically, ductility (energy in Kgf×mm) was determined in an Instron tester with specially designed jigs 10 and 20. A schematic representation is depicted in FIG. 1. This test was specially developed to measure the energy required to bend a compact disk. The disk 20 (($\phi$=120 mm, thickness 1.2 mm) was fixed between the jigs 10 and pressed with a cross head speed of 500 mm/min. The maximal stroke was 95 mm. The energy required to bend the disk which relates to ductility, was monitored automatically.

The reproducibility is very good for this measurement method—the gauge R & R for this text was measured at 27%.

We found that the CD's molded from the melt polycarbonate having a fries level of 1400 ppm (Lot A) had a ductility of 150 Kgf×mm, whereas the CD's molded from the melt polycarbonate having a Fries level of 700 ppm (Lot B) had a ductility of 345 Kgfxmm. Therefore, it is desirable to use lower Fries melt polycarbonate for making optical disks to improve their durability.

EXAMPLE 4

Molding Compact Disks From the Low Fries Melt Polycarbonate

Polycarbonate having Fries levels of 0 ppm, 79 ppm, 198 ppm, 290 ppm and 360 ppm was prepared, molded into CD's and the CD's were tested as described in Example 3.

The results are presented in Table 4, below.

TABLE 4

| Sample | Fries | Peak Injection Pressure | Ductility |
|---|---|---|---|
| (1) | 0 | 92.5 | 551 |
| (2) | 79 | 92.5 | 556 |
| (3) | 198 | 92.5 | 536 |
| (4) | 290 | 90.5 | 520 |
| (5) | 360 | 89.5 | 484 |

One can see from Table 4 that ductility increases with a decreasing level of Fries. Below about 80 to 100 ppm Fries, the ductility no longer improves upon decreasing the level of Fries. Peak injection pressure is not greatly affected by the Fries content.

The polycarbonate that was molded to make samples (1)–(5) was prepared by the following procedures.

The polycarbonate having 0 Fries was prepared by a conventional, interfacial synthesis method. This interfacial polycarbonate had a melt flow index of 10. It was end capped with phenol, and contained 0.04% glycerol monostearate.

The polycarbonates having 79 and 198 ppm Fries were made by blending interfacial polycarbonate with melt polycarbonate. Specifically, the above-described interfacial polycarbonate was blended with melt polycarbonate having from 800 to 900 ppm Fries. Samples (2) and (3) were prepared by blending the interfacial resin with melt resin in ratios of 75/25 and 90/10, respectively.

Samples (4) and (5) were prepared in a commercial melt reactor as described in Japanese Published Patent Application Nos. JP 6032886 and JP 2153925. In these two reactions, the residual impurity sodium in the bisphenol-A feedstock acted as the catalyst. No other catalyst was added. Table 5 below presents a summary of the reaction conditions.

TABLE 5

| OPERATING CONDITIONS | UNIT | OQ1020C-112 | OQ1020C-112 |
|---|---|---|---|
| Na in BPA | ppb | (–) | 45 |
| ADD.Na | ppb | 0 | 0 |
| DPC/BPA | mol ratio | 1.077 | (–) |
| TEMP.R1 | ° C. | 230 | 230 |
| VAC.R1 | torr | 130.0 | 130.0 |
| TEMP R2 | ° C. | 270.0 | 270.0 |
| VAC.R2 | torr | 20.0 | 20.0 |
| TEMP R3 | ° C. | 293.0 | 292.6 |
| VAC.R3 | torr | 1.250 | 1.460 |
| STIR.SP.R3 | rpm | 20.0 | 20.0 |
| MELT VISC. R3 | poise | 814 | 878 |
| TEMP.R4 | ° C. | 286.3 | 285.6 |
| VAC.R4 | torr | 0.30 | 0.31 |

TABLE 5-continued

| OPERATING CONDITIONS | UNIT | OQ1020C-112 | OQ1020C-112 |
|---|---|---|---|
| STIR.SP.R4 | rpm | 10.0 | |
| MELT VISC. R4 | poise | 1361 | 1426 |
| THROUGHPUT | kg/h | 4226 | 4041 |
| PELL.SPEED | m/s | 206.0 | (–) |
| LOT DATA | UNIT | — | — |
| MFR | g/10 min | 11.2 | 11.0 |
| PELLET IV | dl/g | 0.358 | 0.358 |
| EC | % | 80.8 | 79.6 |
| FRIES | ppm | 290 | 360 |
| YI | (1) | 0.95 | 0.92 |

Although the present invention has been described in considerable detail with reference to certain preferred versions thereof, other versions are also meant to be included in the appended claims. Therefore, the spirit and scope of the appended claims should not be limited to the description of the preferred versions contained herein.

What is claimed is:

1. An optical disk comprising polycarbonate obtained from a melt transesterification reaction of a carbonate diester with a dihydroxy compound in the presence of a catalyst selected from the group consisting of alkali metal phosphites, alkali earth metal phosphites, alkali metal phosphites, alkali earth metal phosphites, alkali metal sulfates, alkali earth metal sulfates, and combinations comprising at least one of the foregoing catalysts, wherein the disk has a ductility of greater than 150 kgf/mm and a Fries level of about 119 to about 1400 parts per million.

2. The optical disk of claim 1, wherein the disk has a ductility of greater than 200 kgf/mm.

3. The optical disk of claim 1, wherein the disk has a ductility of greater than 300 kgf/mm.

4. The optical disk of claim 1, wherein the disk has a ductility of greater than 480 kgf/mm.

5. The optical disk of claim 1, wherein the catalyst is selected from the group consisting of sodium hydrogen phosphate, potassium dihydrogen phosphate, cesium dihydrogen phosphate and combinations comprising at least one of the foregoing alkali metal phosphates.

6. The optical disk of claim 1, wherein the catalyst is selected from the group consisting of potassium sulfate, cesium sulfate, and combinations comprising at least one of the foregoing sulfates.

7. The optical disk of claim 1, wherein the polycarbonate has an MFR(1.2 kg, 250° C.) of 5 to 30.

8. The optical disk of claim 1, wherein the polycarbonate has an MFR(1.2 kg, 250° C.) of 10 to 17.

9. The optical disk of claim 1, wherein the polycarbonate has an MFR(1.2 kg, 250° C.) of less than 15.

10. The optical disk of claim 1, wherein the polycarbonate has an MFR(1.2 kg, 250° C.) of less than 14.

11. The optical disk of claim 1, wherein the optical disk further comprises ABS resin.

12. An optical disk comprising polycarbonate obtained from a melt transesterification reaction of a carbonate diester with a dihydroxy compound in the presence of a catalyst and cocatalyst, wherein the catalyst is selected from the group consisting of alkali metal phosphites, alkali earth metal phosphites, alkali metal phosphites, alkali earth metal phosphites, alkali metal sulfates, alkali earth metal sulfates, and combinations comprising at least one of the foregoing catalyst, and wherein the cocatalyst is selected from the group consisting of tetra alkyl ammonium hydroxides and tetra alkyl phosphonium hydroxides, and wherein the disk has a ductility of greater than 150 kgf/mm and a Fries level of about 119 to about 1400 parts per million.

13. The optical disk of claim 12, wherein the disk has a ductility of greater than 200 kgf/mm.

14. The optical disk of claim 12, wherein the disk has a ductility of greater than 300 kgf/mm.

15. The optical disk of claim 12, wherein the disk has a ductility of greater than 480 kgf/mm.

16. The optical disk of claim 12, wherein the catalyst is selected from the group consisting of sodium hydrogen phosphate, potassium dihydrogen phosphate, cesium dihydrogen phosphate and combinations comprising at least one of the foregoing alkali metal phosphates.

17. The optical disk of claim 12, wherein the catalyst is selected from the group consisting of potassium sulfate, cesium sulfate, and combinations comprising at least one of the foregoing sulfates.

18. The optical disk of claim 12, wherein the polycarbonate has an MFR(1.2 kg, 250° C.) of 5 to 30.

19. The optical disk of claim 12, wherein the polycarbonate has an MFR(1.2 kg, 250° C.) of less than 15.

20. The optical disk of claim 12, wherein the optical disk further comprises ABS resin.

* * * * *

UNITED STATES PATENT AND TRADEMARK OFFICE
CERTIFICATE OF CORRECTION

PATENT NO.        : 6,562,433 B1
APPLICATION NO. : 09/663857
DATED             : May 13, 2003
INVENTOR(S)       : H. Ishida et al.

It is certified that error appears in the above-identified patent and that said Letters Patent is hereby corrected as shown below:

In claims 1 and 12 and should be corrected as follows:
"in the presence of a catalyst selected from the group consisting of alkali metal phosphites, alkali earth metal phosphites, alkali metal phosphites, alkali earth metal phosphites, alkali metal sulfates, alkali earth metal sulfates,"

should read as -- in the presence of a catalyst selected from the group consisting of alkali metal phosphites, alkali earth metal phosphites, alkali metal phosphates, alkali earth metal phosphates, alkali metal sulfates, alkali earth metal sulfates, --.

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 6,562,433 B1
APPLICATION NO. : 09/663857
DATED : May 13, 2003
INVENTOR(S) : H. Ishida et al.

It is certified that error appears in the above-identified patent and that said Letters Patent is hereby corrected as shown below:

An error occurs in claims 1 and 12 and should be corrected as follows:
"in the presence of a catalyst selected from the group consisting of alkali metal phosphites, alkali earth metal phosphites, alkali metal phosphites, alkali earth metal phosphites, alkali metal sulfates, alkali earth metal sulfates, "

should read as -- in the presence of a catalyst selected from the group consisting of alkali metal phosphites, alkali earth metal phosphites, alkali metal phosphates, alkali earth metal phosphates, alkali metal sulfates, alkali earth metal sulfates, --.

Signed and Sealed this

Twenty-second Day of May, 2007

JON W. DUDAS
*Director of the United States Patent and Trademark Office*